US006254072B1

(12) United States Patent
Bono et al.

(10) Patent No.: US 6,254,072 B1
(45) Date of Patent: Jul. 3, 2001

(54) SPRING ISOLATOR AND JOUNCE BUMPER FOR A MOTOR VEHICLE SUSPENSION

(75) Inventors: Mark J. Bono, Caton; Timothy S. O'Bryan, Sterling Heights, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/358,836

(22) Filed: Jul. 21, 1999

Related U.S. Application Data

(63) Continuation-in-part of application No. 09/282,359, filed on Mar. 31, 1999, now Pat. No. 6,149,171.

(51) Int. Cl.$^7$ .............................. B60G 13/00; F16F 7/00
(52) U.S. Cl. .................. 267/220; 267/292; 280/124.179
(58) Field of Search .................... 267/219–222, 267/33, 286, 287, 291–294, 169; 280/124.177, 124.178, 124.179

(56) References Cited

U.S. PATENT DOCUMENTS

| | | | |
|---|---|---|---|
| 3,412,990 | * 11/1968 | Gladstone | 267/153 |
| 3,777,838 | * 12/1973 | Barnes | 267/66 |
| 3,901,494 | * 8/1975 | Sena | 267/33 |
| 4,462,608 | * 7/1984 | Lederman | 267/33 |
| 5,052,665 | * 10/1991 | Sakuragi | 267/220 |
| 5,149,069 | * 9/1992 | Hein | 267/153 |
| 5,238,233 | * 8/1993 | Hein | 267/153 |
| 5,257,730 | * 11/1993 | Nakaura | 267/220 |
| 5,467,970 | * 11/1995 | Ratu et al. | 267/153 |
| 5,467,971 | * 11/1995 | Hurtubise et al. | 267/220 |
| 5,775,720 | * 7/1998 | Kmiec et al. | 267/64.15 |

* cited by examiner

Primary Examiner—Robert J. Oberleitner
Assistant Examiner—Robert A. Siconolfi
(74) Attorney, Agent, or Firm—Mark P. Calcaterra

(57) ABSTRACT

The present invention provides a combination isolator and jounce bumper. The combination isolator and jounce bumper is disposed on a spring seat of a suspension system and includes a locating member in the form of a projection extending therefrom. The projection is inserted into an aperture in the spring seat so that the isolator assumes a preselected orientation relative to the spring seat when positioned thereon. A coil spring is secured to a spring retaining portion of the combination isolator and jounce bumper. An orientation member in the form of a second projection is provided at a pre-selected location on the spring retaining portion. The second projection engages an end of the coil spring so that the coil spring assumes a preselected orientation relative thereto. The jounce bumper portion of the isolator projects upwardly from the spring retaining portion so as to be coaxially aligned with the coil spring.

18 Claims, 3 Drawing Sheets

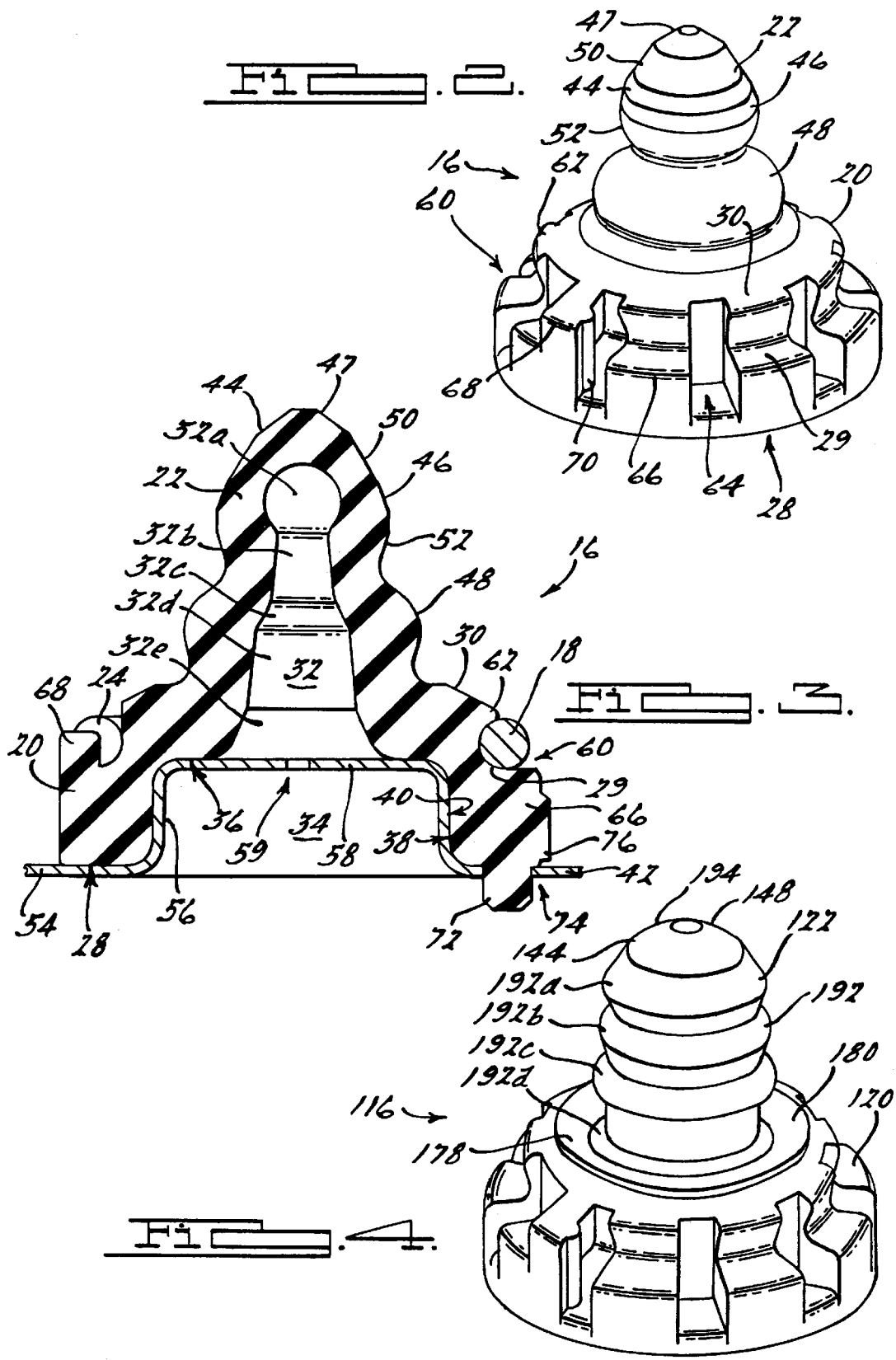

SPRING ISOLATOR AND JOUNCE BUMPER FOR A MOTOR VEHICLE SUSPENSION

CROSS-REFERENCE TO RELATED APPLICATIONS

This application is a continuation-in-part of U.S. application Ser. No. 09/282,359, now U.S. Pat. No. 6,149,171 filed Mar. 31, 1999.

BACKGROUND OF THE INVENTION

1. Technical Field

The present invention generally relates to suspension systems for motor vehicles and, more particularly, to a combination spring isolator and jounce bumper for simultaneously controlling the orientation of the springs of the suspension system and providing a stop for maximum suspension displacement.

2. Discussion

Motor vehicles are typically provided with a suspension mechanism to reduce the transfer of vibrations from a driving surface to the vehicle and its occupants. Such suspension mechanisms often include one or more shocks, struts, and/or springs. One type of spring commonly used in suspension mechanisms is a coil spring.

A known characteristic of a coil spring is its tendency to curve or bow upon compression. That is, as the coils of the spring are forced together under an applied pressure, the spring tends to arc relative to its longitudinal axis. Since space within a vehicle underbody is limited, it is critical to prevent such bowing from causing the spring to impinge upon or otherwise interfere with the other components of the suspension system. Currently, no mechanism is provided for controlling the direction of such bowing.

In some suspension mechanisms a resilient disk known in the art as an isolator is inserted between the coil spring and the spring seat. Such isolators serve to dampen the transmittance of vibrations to the springs. While such prior art isolators have proved effective for their intended purpose, there is room for improvement in the art. For example, the isolator may provide a convenient platform for a mechanism dedicated to controlling the bowing direction of the spring.

Some suspension mechanism also employ a discrete member known as a jounce bumper to prevent the vehicle from damage upon maximum deflection of the suspension system. The jounce bumper is interposed between a lower suspension arm and an upper suspension arm. When a large road disturbance is experienced, the lower and upper suspension arms thrust towards one another. The jounce bumper stops the two suspension members at a certain distance from one another to avoid damage. While such jounce bumpers perform well for their intended purpose, there is room for improvement in the art. For instance, the jounce bumper may be formed in combination with the spring isolator.

In view of the foregoing, it would be desirable to provide a single member for controlling the bowing and maximum compression of the coil springs of a motor vehicle suspension system.

SUMMARY OF THE INVENTION

The above and other objects are provided by a combination isolator and jounce bumper. The combination isolator and jounce bumper is disposed on a spring seat of a suspension system and includes a locating member in the form of a projection extending therefrom. The projection is inserted into an aperture in the spring seat so that the isolator assumes a preselected orientation relative to the spring seat when positioned thereon. A coil spring is secured to a spring retaining portion of the combination isolator and jounce bumper. An orientation member in the form of a second projection is provided at a pre-selected location on the spring retaining portion. The second projection engages an end of the coil spring so that the coil spring assumes a preselected orientation relative thereto. The jounce bumper portion of the isolator projects upwardly from the spring retaining portion so as to be coaxially aligned with the coil spring.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 2 is a perspective view of a combination isolator and jounce bumper for use in a suspension mechanism such as that depicted in FIG. 1;

FIG. 3 is a cross-sectional view of the isolator and jounce bumper of FIG. 2;

FIG. 4 is a perspective view of an alternate embodiment combination isolator and jounce bumper to the present invention;

DETAILED DESCRIPTION OF THE PREFERRED EMBODIMENTS

The present invention is directed towards a combination isolator and jounce bumper for a suspension system in a motor vehicle. The isolator/bumper includes orientation members for positioning the isolator/bumper in a preselected orientation relative to a spring seat of the suspension system and for positioning a coil spring in a preselected orientation relative to the isolator/bumper. Accordingly, any bowing of the coil spring is directed in a preselected manner. The isolator/bumper also includes a jounce bumper portion upwardly projecting therefrom so as to be coaxially aligned with the coil spring. As such, the maximum compression of the suspension system is limited by the impingement of the suspension members on the jounce bumper.

Figure 1:
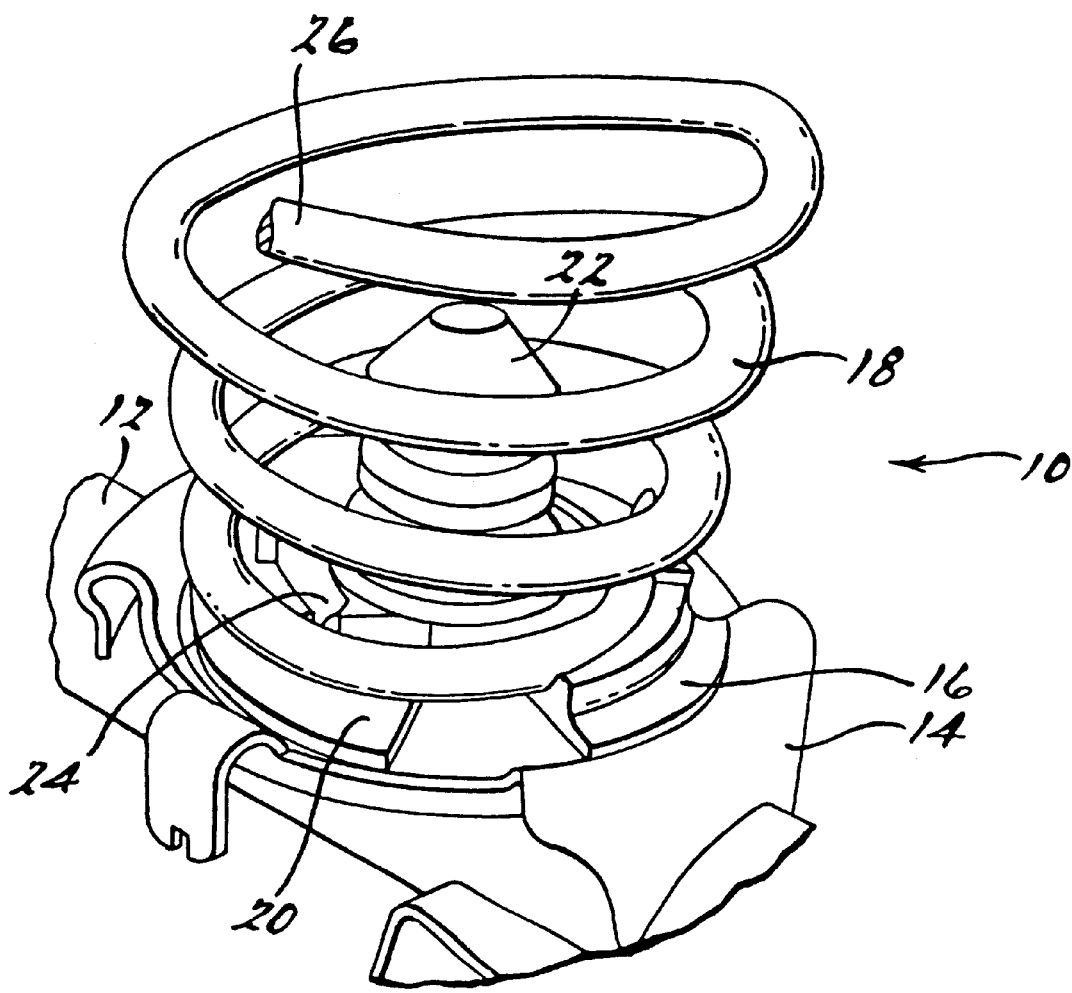
FIG. 1 is a perspective view of a suspension mechanism in accordance with the teachings of the present invention.

Turning now to the drawing figures, FIG. 1 illustrates a suspension system for a motor vehicle generally at 10. The suspension system 10 includes an axle 12, a spring seat 14, a combination isolator and jounce bumper 16, and a coil spring 18. The isolator/bumper 16 includes an isolator portion 20 and a jounce bumper portion 22.

The spring seat 14 is connected to an outboard end of the axle 12 using conventional techniques such as welding. The isolator/bumper 16 is disposed on a top surface of the spring seat 14 in such a manner, as will be described in greater detail below, so that the isolator assumes a pre-selected orientation relative thereto. Similarly, the coil spring 18 is coupled to a top surface of the isolator/bumper 16 such that it assumes a pre-selected orientation relative thereto.

The coil spring 18 includes a first end 24 and a second end 26 (for convenience, the end 26 has been illustrated as being two or three coils lower than it might be in a commercial embodiment). The ends 24 and 26 are commonly oriented 180° apart. Due to the nature of a coil spring, the coil spring tends to bow away from a plane wherein the ends 24 and 26 reside when compressed. Taking this characteristic into account, the end 24 is positioned so as to abut a portion of the isolator/bumper 16 which is held in a preselected location relative to the spring seat 14. As such, when a force is applied to the coil spring 18, any bowing thereof occurs in a preselected direction. Preferably, this direction is at an angle of about 45° forward relative to a longitudinal axis of the vehicle within which the suspension system 10 is installed.

The isolator/bumper 16 illustrated in FIG. 1 is specifically tailored to accommodate the pigtail end 24 and barrel shape of the coil spring 18. Such coil springs are commonly employed in the rear suspension systems of modern motor vehicles. Upon compression, consecutive coils along the length of the coil spring 18 nest within one another. As such, rather than stacking axially upon one another when compressed, the coils of the coil spring 18 concentrically wrap one about another. The jounce bumper portion 22 controls the minimum height that the coil spring 18 may compress. For this purpose, the jounce bumper portion 22 is preferably concentrically aligned with the coil spring 18. Upon maximum compression of the coil spring 18, the jounce bumper portion 22 prevents the suspension members from damage.

Turning now to FIGS. 2 and 3, a more detailed view of an isolator/bumper 16 is illustrated. This isolator/bumper 16 illustrated in FIG. 2 is slightly different than that illustrated in FIG. 1. This isolator/bumper is designed to accommodate a coil spring 18 without a pig tail and having a right cylinder shape, e.g., non-barrel. Such springs are commonly employed in the front suspension systems of modern motor vehicles.

The isolator/bumper 16 is generally don't-shaped and includes a first or bottom surface 28, a second or spring receiving surface 29, and a third or top surface 30. The isolator/bumper 16 is preferably formed of a resilient material and, in a preferred embodiment, is formed of rubber. Alternately, the jounce bumper portion 22 may be formed of rubber, microcellular urethane or polyurethane.

The generally cylindrical jounce bumper portion 22 upwardly projects relative to the top surface 30 and, in this embodiment, is preferably formed integrally, i.e., contiguously, therewith. The jounce bumper portion 22 includes an axial bore 32 formed therein for providing space for the jounce bumper portion 22 to fill upon compression. The axial bore includes a spherical portion 32a, a first conical portion 32b, a second conical portion 32c, a third conical portion 32d, and a fourth conical portion 32e. The diameter of the spherical portion 32a is greater than the average diameter of the first conical portion 32b. The first conical portion 32b diverges away from the spherical portion 32a to the second conical portion 32c. The second conical portion 32c diverges away from the first conical portion 32b to the third conical portion 32d. The angle of divergence of the second conical portion 332c is greater than that of the first conical portion 32b. The third conical portion 32d diverges away from the second conical portion 32c to the fourth conical portion 32e. The angle of divergence of the third conical portion 32d is less than that of the second conical portion 32c. The fourth conical portion 32e flares outwardly from the third conical portion 32d along a curve so as to form an arcuate surface. The angle of divergence of the fourth conical portion 32e is greater than that of the third conical portion 32d.

The bottom surface 28 includes a cylindrical opening 34 leading to the fourth conical portion 32e of the axial bore 32. The transition from the opening 34 to the axial bore 32 is preferably stepped such that an essentially planar surface 36 is provided therebetween. The surface 38 of the isolator/bumper adjacent the opening 34 is configured to cooperate with a complimentary shaped surface 40 (i.e., cylindrical) of a spring seat 42.

The exterior surface 44 of the jounce bumper portion 22 includes a conical bulb portion 46 at a distal end 47 and an annular bulb portion 48 between the conical bulb portion 46 and the top surface 30. The conical bulb portion 46 preferably includes a leading conical portion 50 transitioning to a trailing annular arcuate portion 52. The annular arcuate portion 52 leads to the annular bulb portion 48.

The bottom surface 28 of the isolator/bumper 16 is preferably seated on the spring seat 42. The spring seat 42 is preferably formed of steel and includes an annular flange portion 54 adjacent the bottom surface 28, a cylindrical wall 56 upwardly projecting from the annular flange portion 54 so as to be adjacent the inner surface 38 of the isolator/bumper 16, and a disc portion 58 extending laterally across the cylindrical wall 56 so as to separate the opening 34 from the axial bore 32. The disc portion 58 includes an air vent hole 59 formed therein.

The isolator portion 20 includes an annular groove 60 formed about a perimeter thereof for receiving the lowermost coil of the coil spring 18. A plurality of protrusions or lips 62 radially project from a perimeter of the top surface 30 so as to form an annular ring overhanging the groove 60. The plurality of protrusions 62 form a retention member for securing the coil spring 18 to the isolator/bumper 16. This enables the coil spring 18 and isolator/bumper 16 to be preassembled and installed as a single unit into the suspension system 10. Although other designs are possible, it is presently preferred to form the top surface 30 and protrusions 62 such that they are angled towards the bottom surface 28. In this way, the coil spring 18 is encouraged toward the groove 60 when it is initially seated on the isolator/bumper 16. Also, since the protrusions 62 are preferably formed of flexible rubber, the coil spring 18 may be snap fit into the groove 60.

The isolator/bumper 16 also includes a plurality of notches 64 equidistantly formed about an outer perimeter thereof. More particularly, the notches 64 are formed in the second surface 29 of the isolator/bumper 16 which extends between the top surface 30 and bottom surface 28 and includes the groove 60. The notches 64 subdivide the second surface 29 into a plurality of L-shaped spokes or seats 66 radially extending form a root diameter of the isolator/bumper 16. The seats 66 individually accommodate discrete portions of the lowermost coil of the coil spring 18. Preferably, each seat 66 is aligned with a complimentary protrusion 62. By providing the notches 64, contact between the isolator/bumper 16 and the coil spring 18 is minimized. Such minimized contact enhances damping by interrupting paths for vibrations.

The isolator/bumper 16 also includes a spring orientation member 68 in the form of a nub or projection radially extending from the second surface 29 and top surface 30. The projection 68 preferably extends axially and radially through the groove 60 so as to provide a stop for interfering with the end 24 of the coil spring 18. When the end 24 of the coil spring 18 abuts the projection 68, the coil spring 18 is positioned in a preselected orientation relative to the isolator/bumper 16. If desired, the projection 68 may be provided with a wear enhancing feature such as the half cylinder nub 70. Although the projection 68 is illustrated as being generally rectangularly shaped, other configurations may substitute therefore.

The bottom surface 28 of the isolator/bumper 16 includes an isolator locating member 72 in the form of a nub or projection axially extending away from the bottom surface 28. Although the projection 72 may be formed at any location along the bottom surface 28, it is presently preferred to locate it approximately 160° to 200° away from the projection 68. More preferably, the projection 72 is located 175° away from the projection 68. The spring seat 42 includes an aperture 74 for accommodating the projection 72.

When the isolator/bumper 16 is properly disposed on the spring seat 42, the locating projection 72 nests within the complimentary sized and shaped aperture 74. As such, the isolator/bumper 16 as a whole, and the orientation projection 68 in particular, are located at a preselected position relative to the spring seat 42. Since it is presently preferred to direct any bowing of the coil spring 18 outward and forward relative to the vehicle, the aperture 74 on the spring seat 42 is located for properly orienting the coil spring 18 in the preferred manner.

In order to assist assembly, a tab 76 may be provided on the perimeter of the isolator/bumper 16 at a preselected location. The tab 76 is used to align the isolator/bumper 16 relative to the spring seat 42. Although the tab 76 may be located at any location along the perimeter of the isolator/bumper 16, it is presently preferred to position it so as to be aligned with the locating projection 72.

Figure 5:
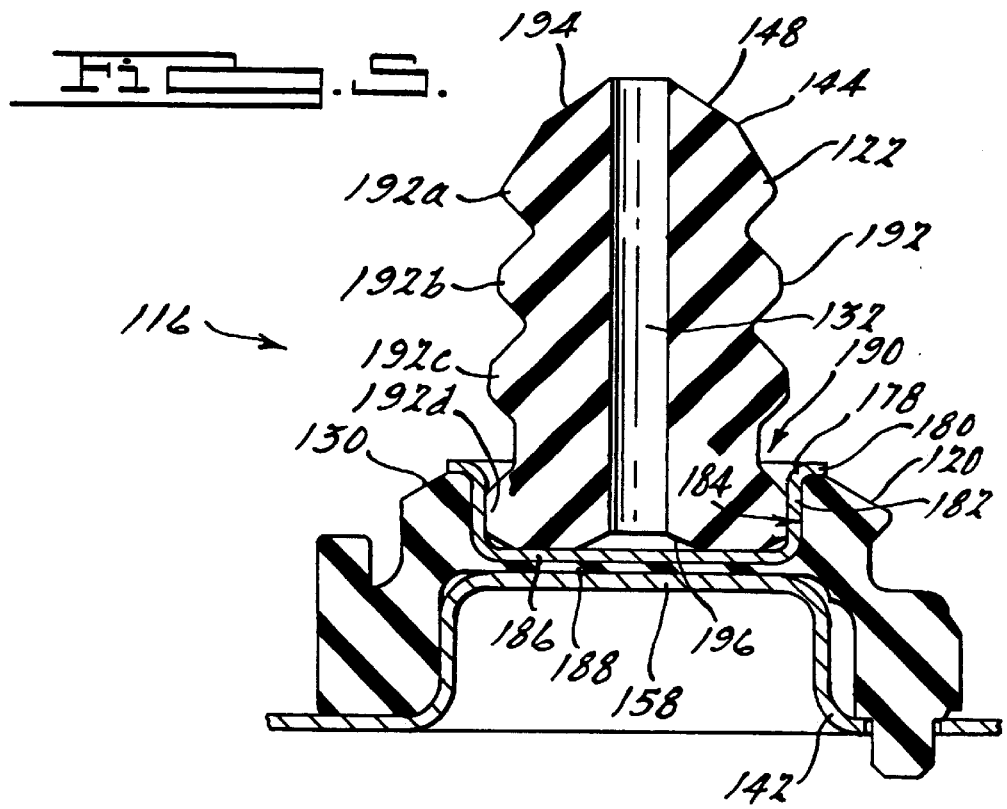
FIG. 5 is a cross-sectional view of the isolator of FIG. 4.

Turning now to FIGS. 4 and 5, an alternate embodiment combination isolator and jounce bumper is illustrated. The alternate embodiment isolator/bumper 116 is essentially identical to the embodiment described with respect to FIGS. 2 and 3 above with exception of the jounce bumper portion 122. More particularly, the jounce bumper portion 122 is formed discretely, i.e., not integrally, from the isolator portion 120. Further, a metal ring 178 is disposed between the jounce bumper portion 122 and the isolator portion 120.

The metal ring 178 includes an annular flange portion 180 adjacent the top surface 130, a cylindrical wall 182 downwardly projecting from the annular flange portion 180 so as to be adjacent a cylindrical surface 184 of the isolator portion 120, and a disc portion 186 extending across the cylindrical wall 182 so as to be adjacent a circular surface 188 of the isolator portion 120. The cylindrical surface 184 and the circular surface 188 of the isolator portion 120 form a cylindrical bore 190 in the top surface 130 of the isolator portion 120. The circular surface 188 separates the disc portion 186 of the metal ring 178 from the disc portion 158 of the spring seat 142. The metal ring 178 provides structure to the isolator/bumper 116 while efficiently distributing loads therethrough. The ring 178 also increases the durability of the isolator 116.

The outer surface 144 of the jounce bumper portion 122 includes a plurality of radially projecting annular rings 192. Preferably, four radially projecting rings 192a–d are spaced along the outer surface 144. The annular rings 192a–c are preferably equidistantly spaced while the fourth annular ring 192d is slightly further offset from the third annular ring 192c. The distal end 148 preferably includes a sloped portion 194 leading to the first annular ring 192a. The annular ring 192d preferably abuttingly engages the cylindrical wall 182 of the metal ring 178.

The axial bore 132 formed through the jounce bumper portion 122 is preferably shaped as a right cylinder. An end 196 of the axial bore 132 flares outwardly to the disc portion 186 of the metal ring 178. The axial bore 132 is preferably centrally located within the jounce bumper portion 122 and is coaxially aligned with the isolator portion 120.

Figure 6:
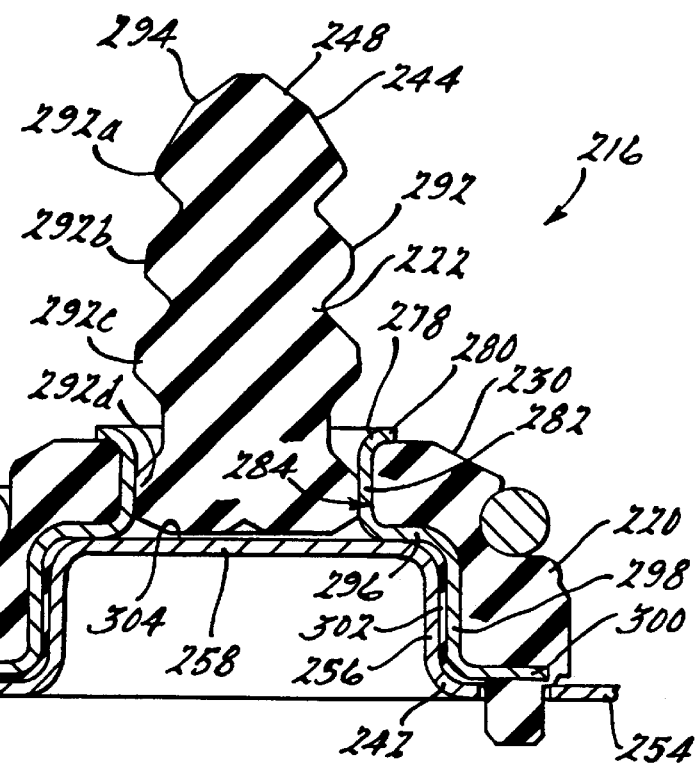
FIG. 6 is a cross-sectional view of another alternate embodiment combination isolator and jounce bumper according to the present invention.

Turning now to FIG. 6, another alternate embodiment combination isolator and jounce bumper is illustrated. The isolator/bumper 216 is essentially identical to the embodiments described above with respect to FIGS. 2–5 with the exception of the configuration of the jounce bumper portion 222 and metal ring 278. For example, the jounce bumper portion 222 is solidly shaped and does not include an axial bore formed therein.

The metal ring 278 includes a first annular flange portion 280 adjacent the top surface 230, a first cylindrical wall 282 downwardly projecting from the annular flange portion 280 so as to be adjacent cylindrical surface 284 of the isolator portion 220, a second annular flange portion 296 radially extending from the first cylindrical wall 282 so as to extend into the isolator portion 220, a second cylindrical wall 298 downwardly projecting from the annular flange portion 296 so as to be adjacent the cylindrical wall 256 of the spring seat 242, and a second annular flange portion 300 radially projecting from the cylindrical wall 256 so as be adjacent the annular flange 254 of the spring seat 242. The isolator portion 220 is preferably molded over the second cylindrical wall 298 and the second annular flange portion 300 such that an annular, L-shaped piece of isolator material 302 is interposed between the metal ring 278 and spring seat 242.

The outer surface 244 of the jounce bumper portion 222 includes a plurality of radially projecting annular rings 292. Preferably, four annular rings 292a–d are spaced along the outer surface 244. The annular rings 292a–c are preferably equidistantly spaced while the fourth annular ring 292d is slightly further offset from the third annular ring 292c. The distal end 248 preferably includes a sloped portion 294 leading to the first annular ring 292a. The end 304 abuts the disc portion 258 of the spring seat 242. The annular ring 292d abuttingly engages the first cylindrical wall 282 of the metal ring 278.

Thus, the present invention provides a combination isolator and jounce bumper for a suspension system of a motor vehicle. The isolator portion directs bowing of the coil spring in a predetermined direction while the jounce bumper sets the maximum compression distance for the suspension components. Also, the isolator portion includes a retainer mechanism for securing the coil spring thereto and a plurality of surface relief features to reduce the transfer of vibrations to the coil spring.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A combination spring isolator and jounce bumper member for a suspension system comprising:

a first surface supporting said member relative to a spring seat of said suspension system;

a locating projection on said first surface interfering with a surface of said spring seat and circumferentially orienting said isolator relative to said spring seat;

a second surface adjacent said first surface engaging a coil spring of said suspension system;

an orientation projection on said second surface interfering with an end of said coil spring and circumferentially orienting said coil spring relative to said second surface;

a third surface adjacent said second surface and opposite said first surface; and a resilient, cylindrical jounce projection upwardly extending relative to said third surface.

2. The isolator of claim 1 further comprising a retention member on said second surface securing said coil spring to said second surface.

3. The isolator of claim 1 wherein said second surface includes at least one notch formed therein disrupting a vibration path through said isolator.

4. The isolator of claim 1 wherein said resilient, cylindrical projection includes an axial bore formed therein.

5. The isolator of claim 4 wherein said axial bore diverges from a first end of said cylindrical projection to a second end thereof.

6. The isolator of claim 1 wherein said resilient, cylindrical projection further comprises a conical bulb portion adjacent an annular bulb portion.

7. The isolator of claim 1 wherein said resilient, cylindrical projection further comprises a plurality of radially projecting annular rings.

8. The isolator of claim 1 wherein said resilient, cylindrical projection is formed integrally with said third surface.

9. The isolator of claim 1 wherein said resilient, cylindrical projection is disposed within an axial bore formed within said third surface.

10. The isolator of claim 9 wherein a cylindrically shaped metal ring is disposed within said axial bore so as to engage an end of said resilient, cylindrical projection.

11. A combination spring isolator and jounce bumper member for a suspension system comprising:

a lower surface supporting said member relative to a spring seat;

a locating projection on said lower surface interfering with a surface of said spring seat and circumferentially orienting said member relative to said spring seat;

an intermediate surface adjacent said lower surface and engaging a coil spring of said suspension system;

an orientation projection on said intermediate surface interfering with an end of said coil spring and circumferentially orienting said coil spring relative to said intermediate surface;

a retention member on said intermediate surface securing said coil spring to said intermediate surface;

at least one vibration path disrupting notch formed in said intermediate surface;

an upper surface adjacent said intermediate surface and opposite said lower surface; and a resilient, cylindrical jounce projection upwardly extending relative to said upper surface.

12. The isolator of claim 11 wherein said resilient, cylindrical projection is formed integrally with said upper surface.

13. The isolator of claim 11 wherein said resilient, cylindrical projection is disposed within an axial bore formed within said upper surface.

14. The isolator of claim 13 wherein a cylindrically shaped metal ring is disposed within said axial bore so as to engage an end of said resilient, cylindrical projection.

15. The isolator of claim 11 wherein said resilient, cylindrical projection includes an axial bore formed therein.

16. The isolator of claim 15 wherein said axial bore diverges from a first end of said cylindrical projection to a second end thereof.

17. The isolator of claim 11 wherein said resilient, cylindrical projection further comprises a conical bulb portion adjacent an annular bulb portion.

18. The isolator of claim 11 wherein said resilient, cylindrical projection further comprises a plurality of radially projecting annular rings.

* * * * *